June 22, 1937. R. F. GOECKE 2,084,614

LIQUID TREATING APPARATUS

Original Filed May 31, 1934 2 Sheets—Sheet 1

INVENTOR
Rudolph F. Goecke
BY Edward H. Dempster
his ATTORNEY

INVENTOR
Rudolph F. Goecke
BY Edward H. Cumpston
his ATTORNEY

Patented June 22, 1937

2,084,614

UNITED STATES PATENT OFFICE 2,084,614

LIQUID TREATING APPARATUS

Rudolph F. Goecke, Elyria, Ohio, assignor to The Pfaudler Co., Rochester, N. Y., a corporation of New York Application May 31, 1934, Serial No. 728,364
Renewed May 10, 1937

2 Claims. (Cl. 257—106)

This invention relates to apparatus for processing or treating liquids, using this term in a broad sense as including also semi-liquids. For purposes of illustration and description, the invention is embodied in apparatus intended mainly for pasteurizing or otherwise processing milk and cream, though capable also of other uses.

An object of the invention is the provision of simplified and improved apparatus of this character, of few parts, economical in construction, easy to operate, rugged in use, and flexible in operation.

Another object is the provision of compact self-contained apparatus including a liquid container, together with liquid heating or cooling means with or without agitating means, so designed and arranged that the heating or cooling means with the agitating means, if any, may be quickly and easily removed from within the container to a more convenient position for cleaning, without disturbing in any way the connections for supplying heating or cooling fluid to the heating or cooling means.

A further object is the provision of improved fluid connections leading to and from a coil mounted upon a movable cover or closure of a container, so that these fluid connections will permit the cover to be opened and closed without affecting the connections or disconnecting any parts thereof.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

This application is a continuation in part of my copending application for patent on Liquid treating apparatus, Serial No. 639,861, filed October 27, 1932.

Figure 1:
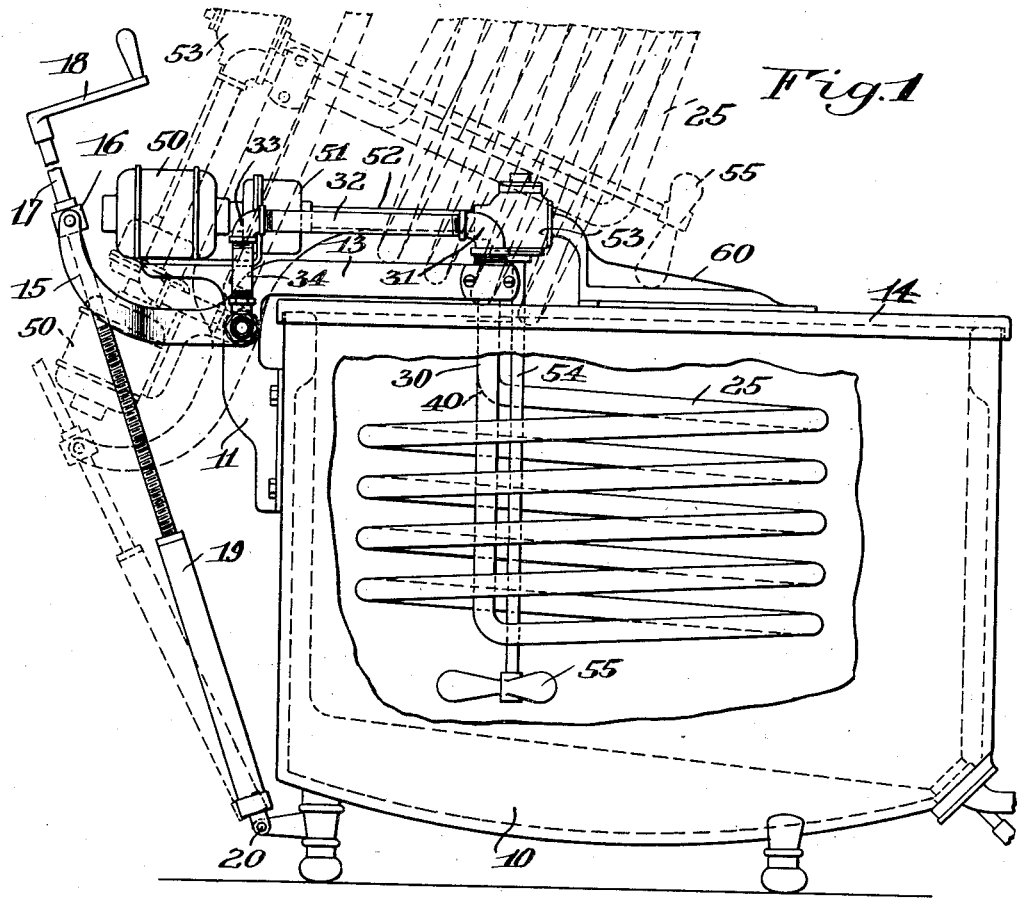
Fig. 1 is a side elevation, with parts broken away, of apparatus constructed in accordance with one embodiment of the invention.
Figure 2:
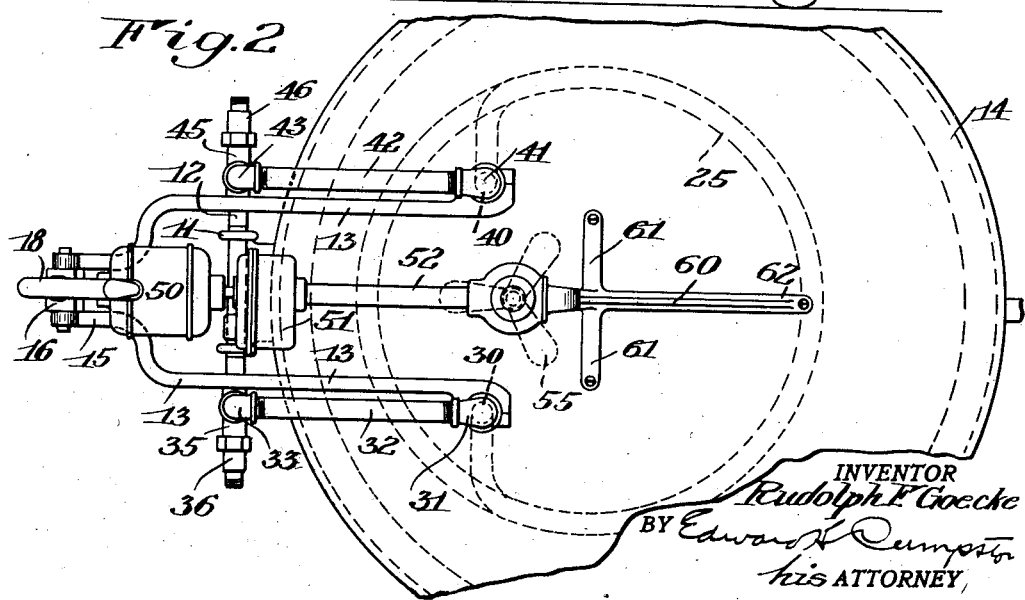
Fig. 2 is a fragmentary plan of the parts shown in Fig. 1.

The illustrative embodiment of the invention shown in Figs. 1 and 2 of the drawings comprises a container 10 having fixed to one wall thereof a bracket 11 on which is pivotally mounted, by means of a shaft or pin 12, a second or cover bracket 13 connected to a cover or closure element 14. The cover may be opened and closed, swinging up and down around the pivotal axis 12, in any suitable way. For example, the cover bracket 13 may have a rearward extension 15 pivotally connected to a collar 16 on a screw 17 which can be rotated by a handle 18 to screw it farther into or out of a socket 19 pivotally connected at 20 to any fixed point.

Mounted on the cover and swinging therewith is any suitable heat transfer means which may be, for example, in the form of a helical coil 25 fixedly attached to the cover and provided with suitable fluid connections so that it may be used for either heating or cooling purposes. Preferably the coil is located somewhat eccentrically in the container, as plainly shown in Figs. 1 and 2, with its center nearer to that side of the container adjacent the pivotal axis 12 than to any other side, so that as the coil swings up and down during the opening and closing movements of the cover, the lower forward edge of the coil will readily clear the edge of the container opposite the axis 12.

According to the present invention, the fluid connections for supplying heating or cooling fluid to the heat transfer means 25 are made up of solid piping as distinguished from flexible hose or the like, but are provided with rotatable or swivel joints in alinement with the pivotal axis 12 so as not to interfere with the movements of the cover. For example, one end of the coil may be connected to a riser 30 extending upwardly through the cover 14 and suitably clamped in one arm of the cover bracket 13. This riser is connected in turn by an elbow 31 and a pipe 32 to a second elbow 33 from which a pipe 34 extends downwardly to the swivel joint member 35 alined with the pivotal axis 12. The other member 36 of the swivel joint is capable of relatively easy rotation with respect to the member 35, about the axis 12, so that the member 36 may be connected solidly to any fixed or stationary piping, while the cover and coil may nevertheless be oscillated about the axis 12, due to the ability of the part 35 to swivel or rotate with respect to the part 36.

The other end of the coil may be similarly connected to a riser 40 which extends upwardly through the cover 14 and is clamped in the other arm of the cover bracket 13. This riser 40, in turn, is connected through the elbow 41 and pipe 42 and elbow 43 to the part 45 of another swivel joint likewise alined with the hinge axis 12 and capable of turning with respect to the other part 46 of the joint, which part 46 can be solidly connected to any stationary piping.

With this arrangement, it is seen that no hose or other flexible member is necessary and that the fluid connections are unbroken at all times and do not need to be disconnected in order to tilt the cover or raise the coil out of the container.

When the heat transfer means 25 is fixed or stationary with respect to the cover parts 13 and 14, as is the case in this embodiment, separate liquid agitating means may be provided if desired. For example, an electric motor 50 may be mounted on an extension of the cover bracket 13 and this motor 50 may drive, through a suitable reduction gear 51, a shaft within the tubular housing 52, which shaft is connected, through beveled gears within a housing 53, to a vertical shaft 54 extending downwardly through the cover 14 and through the space within the coil 25, and carrying at its lower end a suitable agitator such as the propeller 55. The motor 50, reduction gearing 51, and parts 52, 53, and 54 are all mounted on the cover parts 13 and 14 so that they all swing together as a unit when the cover is opened or closed. In Fig. 1 these parts are shown in full lines in their normal closed position, and in dotted lines they are illustrated in a partly opened position.

Any suitable brackets may be used to assist in holding the cover 14 in place. For example, a bracket 60 may be rigidly attached at one end to the housing 53 and supported thereby, while this bracket has cross arms 61 and a forwardly extending end 62 connected to the cover 14 to help support it.

Since the parts 13, 14, 51, 52, 53 and 60 are all fixedly connected to each other, they all swing together as a single unit when the cover is opened or closed. The cover bracket 13 may also be considered as a part of the actual cover or closure 14, since it is integral therewith for all practical purposes, and thus the heat transfer means 25 and agitating means 55 can both be described as being mounted on the cover or closure means of the container.

Figure 3:
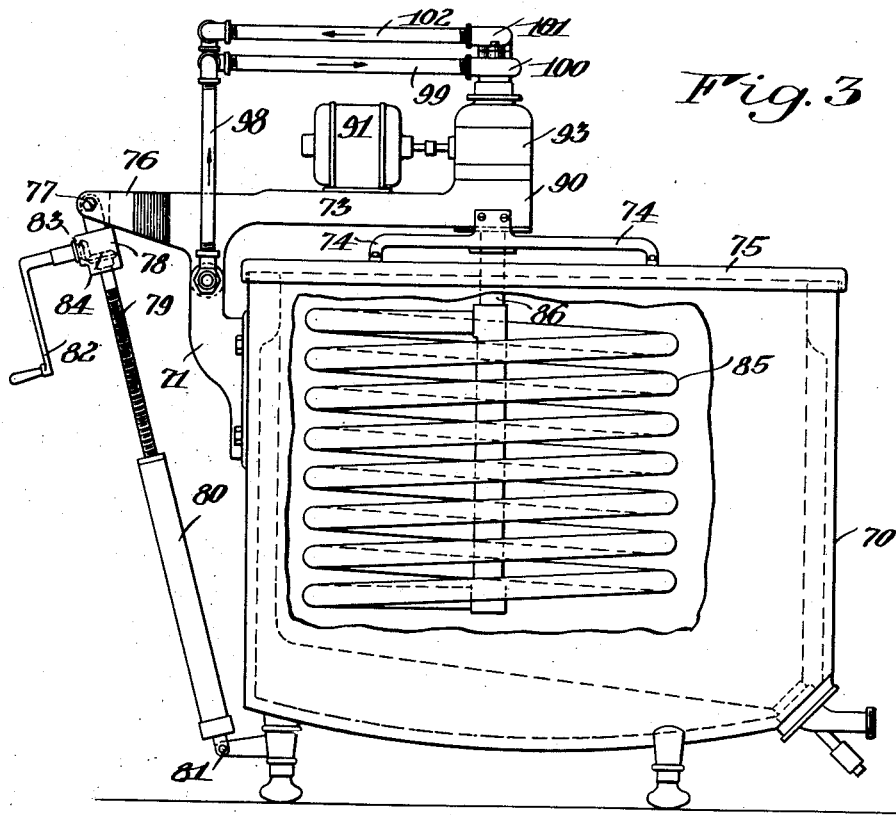
Fig. 3 is a view similar to Fig. 1 showing a different embodiment of the invention.
Figure 4:
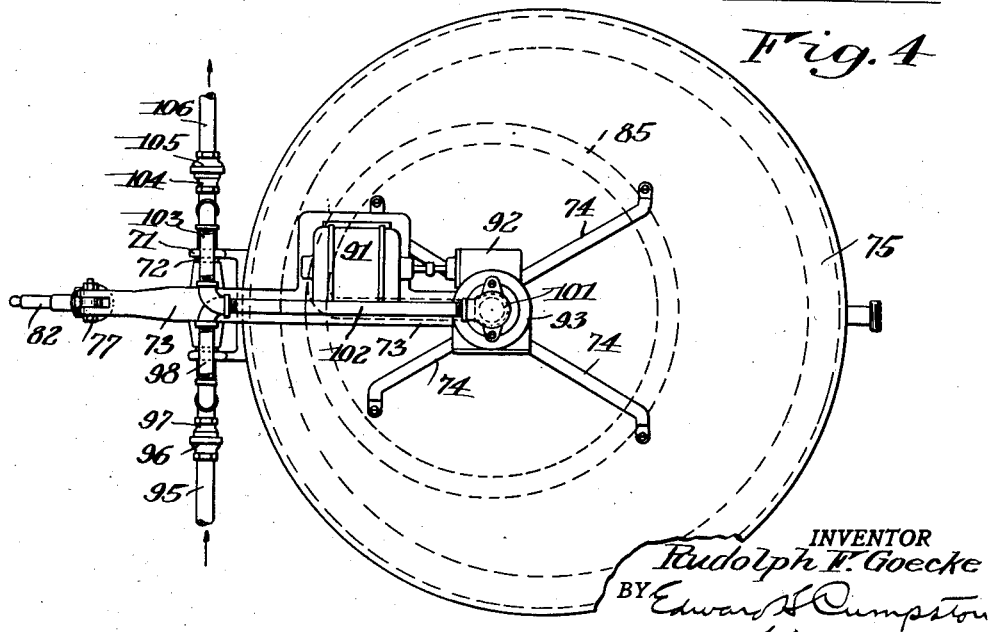
Fig. 4 is a plan of of the parts shown in Fig. 3.

A slightly different form of apparatus is shown in Figs. 3 and 4. Here, the container is indicated in general at 70 and as before it may have a bracket 71 secured to one side thereof which bracket is connected by a suitable pivot 72, to a cover bracket 73 fixedly connected through spider-like arms 74 with the cover or closure 75. A rearward extension 76 on the bracket 73 is pivoted at 77 to a housing 78 in which the upper end of a long screw 79 is received and in which it is capable of rotating though confined against longitudinal movement. The lower end of the screw extends into a tubular member 80 pivoted at 81 to any suitable fixed point. A crank 82 is connected to a beveled gear 83 meshing with a beveled gear 84 at the upper end of the screw 79, so that by turning the crank 82 the screw 79 is rotated and screwed farther into or out of the member 80, with the result that the cover parts 73, 74, 75, and 76 are opened or closed as desired.

Heat transfer means 85 is provided also in this embodiment of the invention, which heat transfer means may be used for either heating or cooling the contents of the container 70. In this case, however, the heat transfer means is not fixed to the cover but is rotatable with respect thereto so that it forms also an agitator.

The heat transfer means 85 is here shown in the form of a helical coil arranged about a central member 86 formed of two tubular members concentrically arranged one within the other so that the space within the inner tubular member provides, for example, a passageway for fluid flowing from the coil, while the annular space between the two tubular members forms a passageway for fluid flowing to the coil, all as disclosed, for example, in said copending application Serial No. 639,861.

This central member 86 rises through the cover 75 and is rotatably mounted in any suitable bearing indicated diagrammatically at 90 and is driven to rotate the heat transfer means by any suitable driving mechanism such as the electric motor 91 driving a worm within the housing part 92 meshing with a worm wheel on the member 86 within the housing part 93, as disclosed in greater detail in said copending application.

The means for supplying fluid to the member 86 may, except as otherwise indicated, be similar to or identical with the corresponding means in said copending application. In place of using hose or other flexible conduits to permit opening and closing of the cover, however, the present invention provides connections of pipe or other rigid conduit material. For example, fluid may be supplied to the heat transfer means through a pipe 95 connected to any suitable source of fluid supply, either hot or cold. The pipe 95 is connected to one side 96 of a swivel joint in axial alinement with the hinge axis 72, the other member 97 of the swivel joint being connected through the pipes 98 and 99 to the supply chamber 100 which corresponds to the chamber 47 in said copending application and which, as shown in said copending application, is in communication with the annular space in the central conduit means 86.

The fluid flowing from the heat transfer means rises through the center of the central means 86 to an outlet chamber 101 corresponding to the outlet chamber 46 shown in said copending application, and thence flows through piping 102 and 103 to one part 104 of a second swivel member likewise in axial alinement with the hinge axis 72, the other member 105 of this swivel connection being suitably connected to any stationary conduit or pipe 106.

It is seen that when the crank 82 is turned, this rotates the screw 79 to open or close the cover or closure of the container, and when this is done, the parts 73, 74, 75, 90, 91, 97, 98, 99, 100, 101, 102, 103, and 104, all being fixed together to form a unitary assemblage, will all swing as a unit together about the hinge axis 72, without disrupting or requiring disassembling of the fluid connections leading to the coil 85, and without the necessity of employing any hose or other flexible conduit connections.

As in the case of the embodiment shown in Figs. 1 and 2, the heat transfer means 85 in Figs. 3 and 4 is preferably eccentric within the container 70, being closer to that side of the container adjacent to the hinge axis 72 than to any other side, so that the lower forward edge of the coil will readily clear the upper forward edge of the container as the coil swings in and out of the container. The cover and associated parts may obviously be swung up to any desired extent or any preferred inclination.

Since the parts 73, 74, and 75 are all connected firmly together as a unit, the bracket 73 forms, in effect, a part of the cover or closure and the heat transfer means 85 may be described broadly as being rotatably mounted on the cover or closure of the apparatus.

In both forms of the invention here shown, the heat transfer means when in normal position within the container will rapidly heat or cool the contents of the container, and when the cover is swung up to its normal open position, both the container and the heat transfer means are accessible for easy and thorough cleaning in a much more satisfactory manner than if the heat transfer means were permanently mounted within the container and could not be readily removed therefrom.

In both forms of the invention here shown, the container is preferably provided with a heat transfer jacket as plainly shown in the drawings and as described in said copending application Serial No. 639,861, so that by the use of this heat transfer jacket the contents of the container can be heated or cooled independently of the heat transfer means 25 or 85 within the container.

I claim:

1. A device for treating liquids, comprising a container, a cover therefor swinging about an axis to open and close the same, a rotatable hollow thermal treatment coil mounted on and swinging with said cover to swing into and out of said container, means to rotate said coil, fixed connections mounted on said cover and swinging therewith to convey thermal treatment fluid to and from said coil, and stationary connections co-axial with said axis to supply and receive thermal treatment fluid to and from said fixed connections.

2. A device for treating liquids, comprising a container, a cover therefor swinging about an axis to open and close the same, a rotatable hollow thermal treatment coil mounted on and swinging with said cover to swing into and out of said tank, means to rotate said coil, fixed connections mounted on said cover and swinging therewith to convey thermal treatment fluid to and from said coil, and stationary connections co-axial with said axis to supply and receive thermal treatment fluid to and from said fixed connections, said coil having a position in and eccentric with respect to said container when said cover is closed and having a position higher than said container when said cover is open, the axis of said coil being about vertical when the cover is closed and about horizontal when the cover is open.

RUDOLPH F. GOECKE.